United States Patent [19]
Chao et al.

[11] 3,775,598
[45] Nov. 27, 1973

[54] FAULT SIMULATION SYSTEM FOR DETERMINING THE TESTABILITY OF A NON-LINEAR INTEGRATED CIRCUIT BY AN ELECTRICAL SIGNAL TEST PATTERN

[75] Inventors: Chester C. Chao, Poughkeepsie; Lawrence K. Lange, Wappingers Falls; Eric Lindbloom, Poughkeepsie, all of N.Y.; Anil D. Savkar, Annandale, Va.

[73] Assignee: International Business Machines Corporation, Armonk, N.Y.

[22] Filed: June 12, 1972

[21] Appl. No.: 261,874

[52] U.S. Cl. .............................. 235/153 AC, 444/1
[51] Int. Cl. .............................. G06f 11/00
[58] Field of Search .................. 235/153 AC, 151.3; 340/172.5; 444/1; 324/73 R, 73 AT

[56] References Cited

UNITED STATES PATENTS

| | | | |
|---|---|---|---|
| 3,636,443 | 1/1972 | Singh et al. | 324/73 R |
| 3,633,100 | 1/1972 | Heilweil et al. | 324/73 R |

OTHER PUBLICATIONS

H. Y. Chang, An Algorithm for Selecting an Optimum Set of Diagnostic Tests, IEEE Transactions on Electronic Computers, Vol. EC-14, No. 5, October 1965. pp. 706–711.

*Primary Examiner*—Charles E. Atkinson
*Attorney*—Julius B. Kraft et al.

[57] ABSTRACT

A system involving the use of fault simulation for determining whether a proposed non-linear integrated circuit is testable by a proposed incremental bilevel electrical signal test pattern. The system, which is particularly advantageous in determining the testability of integrated circuits having sequential logic, involves the conversion of the bilevel electrical test pattern into a corresponding three-level test pattern, and the application of said three-level pattern to a three-level "good" circuit simulation of the integrated circuit and to a number of three-level "bad" circuit simulations of said circuit, each of said "bad" circuit simulations being representative of a different stuck fault condition which is to be determined by the test pattern.

The resulting output of the "good" circuit simulation is compared to each of the resulting outputs of the "bad" circuit simulations, and there is determined both the proportion of the total "bad" circuits whose definitive outputs fail to compare at least once with the corresponding definitive outputs from the "good" circuit simulation, and the proportion of total "bad" circuit simulation manifesting an output at an indeterminate level when the "good" circuit simulation is at a definitive level.

11 Claims, 7 Drawing Figures

FAULT SIMULATION SYSTEM FOR DETERMINING THE TESTABILITY OF A NON-LINEAR INTEGRATED CIRCUIT BY AN ELECTRICAL SIGNAL TEST PATTERN

BACKGROUND OF INVENTION

The present invention relates to the testing of circuits, particularly integrated circuits. More specifically, it relates to a system for determining whether highly complex linear circuits of the type used in integrated circuits and, particularly in large scale integration, are testable by a given electrical test pattern.

Testing of integrated circuits usually involves the application of bilevel electrical signal patterns to input terminals in the circuit being tested and the sensing of the resulting output at output terminals in the circuit in order to determine whether the circuit is defective. Generally, this may be accomplished by applying the electrical signal test pattern to the integrated circuit being tested and sensing the resulting output. This output is then compared to the output resulting from the application of the same test pattern to a circuit or a circuit simulation identical to the circuit being tested which is known to be "good" in order to determine whether the circuit under test is also "good."

The conventional test patterns used for such comparative testing of integrated circuits generally comprise a bilevel electrical signal pattern having a series of changing pattern increments, with each increment comprising a plurality of parallel signals, each of which is at one of said bilevels. The plurality of signals in each pattern increment is applied to a corresponding plurality of input terminals in the circuit under test and to a similar plurality of input points in the "good" or reference circuit. A resulting incremental signal output is taken from the output terminals in the circuit. A "fail-to-compare" in any portion of the incremental output is indicative of a defective circuit.

Generation of such sequential or serial test patterns is well known in the art. A test pattern may be prepared manually or automatically, such as by a computer. A convenient method of generating such a test pattern as a highly rapid sequence of randomly varying pattern increments would be by the pseudo-random number generator described in U.S. Pat. No. 3,614,608. Also, U.S. Pat. No. 3,633,100 discloses the pseudo-random generation of a three-level test pattern as well as the conversion of a bilevel test pattern to such a three-level test pattern.

In the design of integrated circuits, it is, of course, necessary that the integrated circuit be testable in accordance with the above-described procedures. Consequently, it is very important that when an integrated circuit is designed, test patterns suitable for testing said integrated circuit also be provided. It is essential that the test patterns generated have a sequence of varying pattern increments which are sufficient in number and variety to test the proposed integrated circuit. One major fault which the pattern must be capable of detecting in an integrated circuit is that of a "stuck" fault. A stuck fault is defined as a defect in the circuit whereby an input point to a gate in the circuit or an output point from a gate in the circuit is stuck at one of the bilevels, e.g., stuck at "one" or stuck at "zero". All of such input or output points may be referred to as circuit nodes. Stuck conditions or faults in a defective circuit are usually due to fabrication defects in the integrated circuit, such as open circuits, or, in many instances, by short-circuits.

The most commonly used present techniques for evaluating the testability of a proposed integrated circuit, i.e., the ability of the proposed test pattern to detect stuck faults, is known as failing machine simulation or fault simulation. Let us here consider what must be done in evaluating the test pattern. A determination must be made as to whether all or what proportion of all stuck faults will result in a failure-to-compare output between the "good" and "bad" circuit as a result of at least one increment in the test pattern. The presently used fault simulation involves simulating a plurality of "bad" integrated circuits, each of which will have only one different type of stuck fault. The proposed test pattern is then applied to each different "bad" circuit and a comparison is made with the same test pattern applied to the "good" circuit in each case in order to determine whether the resulting output will indicate a fail-to-compare at some increment.

Although fault simulation techniques of determining testability are generally agreed to represent one of the most comprehensive approaches in determining testability of a given integrated circuit with a given test pattern, it is rarely possible to make a determination that a highly complex integrated circuit is "100 percent" testable with a given test pattern. By "100 percent" testable is meant that the test pattern produces a fail-to-compare for each of the "bad" circuits representing each possible fault condition. Because of the increasing complexity and density of integrated circuits at the present state of technology, it is highly improbable that a test pattern, no matter how many increments it may contain, will provide "100 percent" testability for a given integrated circuit, especially non-linear integrated circuits involving sequential logic.

A sequential circuit is one in which the sequences of output are functionally dependent upon the sequences of input conditions. Such sequential circuits are at times subjected to critical race conditions which produce an eccentric output signal at one or more output points, i.e., the same input sequence may produce an output at a given output point at either of the two bilevel logic levels, e.g., a "one" or a "zero" in the bilevel circuit dependent solely on which input signal "wins the race."

In determining the testability of sequential integrated circuits by fault simulation techniques, the bilevel test pattern is converted into a three-level test pattern in which the first and second levels respectively represent the two definitive levels in the original pattern and the third level represents an indeterminate state indicative of an eccentric signal level at a particular circuit node dependent solely on which signal "wins the race." Means for converting a bilevel signal pattern into a three-level signal pattern are described in U.S. Pat. No. 3,633,100. In addition, the "good" circuit simulation and the "bad" circuit simulation which are to be compared are also formed in said three-level logic. Such three-level simulations of the "good" and "bad" circuits may be done completely in software on a computer, as will be herinafter described, or in interconnected discrete hardware components, as described in U.S. Pat. No. 3,633,100.

While the utilization of such three-level simulations for comparison of the effects of the test pattern upon the "good" and "bad" circuits provides a very sound indication of the extent of testability of the integrated circuit by the test pattern, "100 percent" testability cannot usually be determined because in forming the three-level simulation, simplifying assumptions must be made about the delay characteristics in the sequential circuit under critical race conditions. For example, as set forth in U.S. Pat. No. 3,633,100, when representing bilevel logic employing NOR gates in three-level logic, a double-rail logic representation of the NOR circuit is utilized in which each of the NOR gates is represented by a pair of NAND gates, this pair of NAND gates may either be computer simulated or represented by discrete circuit elements. In any event, the assumptions regarding delay in the bilevel NOR circuits in the implementation of the double-rail NAND circuit must involve some simplifications. As a result, neither the software nor the hardware simulations can completely represent all that is going on in the actual integrated circuit. Since the test approaches being utilized for the highly complex integrated circuit involve the application of a test pattern increment to the input terminals in the circuit and the sensing of the resulting output at the output terminals of the circuit, the result is, of course, dependent upon the propagation of the applied pattern through the integrated circuit to the output terminals. Accordingly, the three-level circuit simulation must be capable of providing for all possible cases of fault propagation through the complex circuit. However, because of the limitations of three-level simulation, it is usually impossible to provide for all of these possibilities. It is, therefore, usually impossible to make a "100 percent" determination of testability.

As a result, systems for the determination of testability of sequential circuits by test patterns have been relying on a proportional determination which is less than "100 percent" in determining such testability of integrated circuits. In such an approach, each of the increments of the test pattern in three-level logic is sequentially applied to a simulation of the "good" circuit in three-level logic and simultaneously to each of the "bad" circuit simulations in three-level logic. The output of each of the "bad" circuits is compared to that of the "good" circuit. However, such comparisons are only made if both the "good" and the respective "bad" circuit to which it is being compared are both at one of the two definitive levels. If either the "good" circuit simulation or the "bad" circuit is at the third or indeterminate level, the comparison is not made. Where a comparison is made, a count is kept and a determination is made of the proportion of total "bad" circuit simulations which manifest at least one fail-to-compare with the "good" circuit during the application of the test pattern.

Utilizing such an approach, it has been observed that the best indication of testability achievable, irrespective of the number of increments in the test pattern, ranges from about 85 – 90 percent in the case of moderately complex integrated circuits and even lower in highly complex integrated circuits. Based upon his previous experience with such circuitry being evaluated for testability, the circuit designer can make a determination as to whether the figure achieved represents a satisfactory level of testability for the integrated circuits being evaluated. It has been recognized that such an approach is less than completely satisfactory, and that it would be advantageous to have additional information regarding the testability of the circuit.

SUMMARY OF THE PRESENT INVENTION

Accordingly, it is a primary object of the present invention to provide a system for determining whether an integrated circuit is testable by a particular test pattern which provides more extensive information with respect to the testability of the circuit than is presently available.

It is another object of the present invention to provide a system for determining the testability of a particular integrated circuit by a particular test pattern utilizing "bad" circuit simulations which provides more extensive information regarding the testability of the integrated circuit.

It is an even further object of the present invention to provide a system for determining the testability of a particular integrated circuit by a particular test pattern through the use of three-level test patterns and three-level circuit simulations which provides more extensive information on the testability of the circuit.

It is yet another object of the present invention to provide a system for determining the testability of a particular integrated circuit by a particular test pattern utilizing three-level simulation in which some of the shortcomings and simplifications involved in converting the actual circuit to three-level simulations are compensated for.

Accordingly, in determining whether a given bilevel test pattern is an acceptable test pattern for a given bilevel non-linear integrated sequential circuit, the present invention provides a system in which the test pattern is incrementally applied to a three-level "good" circuit simulation and each of a plurality of three-level "bad" circuit simulations respectively representative of each of the fault conditions which the test pattern is to detect. The resulting outputs are sensed and, in addition to recording the total number of "bad" circuit simulations with outputs at definitive levels which fail to compare at least once with their corresponding outputs from the "good" circuit simulations which are also at definitive levels, the present system further records the total number of "bad" circuit simulations with outputs at indeterminate levels when the corresponding "good" circuit output is at a definitive level.

More particularly, the present invention provides a method for determining whether a given bilevel test pattern is an acceptable test pattern for a given bilevel integrated circuit comprising:

converting the bilevel signal pattern to a three-level signal pattern in which the first and second levels respectively represent the two definitive levels in the original pattern and the third level represents an indeterminate state;

forming a three-level logic "good" circuit simulation of said bilevel integrated circuit in which the first and second levels represent the two definitive states in the bilevel circuit and the third level represents an indeterminate circuit state, said simulation having input and output nodes representative of said circuit nodes and a plurality of circuit nodes intermediate said input and output nodes, and said "good" circuit simulation being free of stuck faults;

for each stuck fault to be detected by said signal pattern, forming a three-level logic "bad" circuit simulation, representative of the circuit with said fault condition, said simulation being identical with said "good" circuit simulation except that the one node at which the fault occurs is fixed at one of said first and second levels;

applying said given bilevel test pattern to the plurality of input nodes of said "good" circuit simulation and to the plurality of input nodes in each of said "bad" circuit simulations;

for each applied increment of said pattern, comparing the output signal increments resulting from said applied increment at said at least one output node of said "good" circuit simulation with the corresponding output signal increment at each of said "bad" circuit simulations;

recording the total number of "bad" circuit simulations having at least one output signal at a definitive level which fails to compare with its corresponding "good" circuit simulation output signal which is at a definitive level; and, recording the total number of "bad" circuit simulations having at least one output signal at said indeterminate level when its corresponding "good" circuit simulation output signal is at a definitive level.

By recording the total number of "bad" circuit simulations with outputs at an indeterminate level when the corresponding "good" circuit simulation output is at a definitive level, the system of the present invention provides the circuit designer with information concerning testability substantially beyond that provided by previous methods for determining testability by fault simulation. Such previous methods consistently avoided the comparison of the "good" and "bad" circuit output increments when the output signals from either type of circuit were at an indeterminate level.

It has now been determined that when the signals in an output of the "good" circuit simulation are at the two definitive levels, this indicates that the pattern increment being applied to the circuit input terminal is capable of propagating through the circuitry of the "good" circuit to the output terminals without the creation of any critical race conditions which result in eccentric or indeterminate output. With such a definitive output on the "good" circuit simulation, if any of the "bad" circuit simulations manifest a corresponding output signal at an indeterminate level, it has been found that this renders it highly probable that during actual integrated circuit testing, the test pattern, upon the application of the input increment which resulted in the indeterminate output increment, will actually produce an output fail-to-compare in a circuit having a fault which makes it equivalent to said "bad" circuit. It has been surprisingly found that in the actual testing of such "bad" circuits whose simulation produced such an indeterminate output when the "good" circuit produced a definitive output, a fail-to-compare surprisingly comes up more frequently than the one chance in two which strict random probability would predict.

Without being bound to the explanation of this observed result, it is believed that in the cases where the "good" circuit simulation produces an output at a definitive level, the inability of a particular "bad" circuit simulation to reach a definitive output as a result of a corresponding input is very often due to simulation shortcomings or limitations which make it impossible for the "bad" circuit simulation to get out of the indeterminate state and generate a definitive value which is different from the "good" circuit simulation. However, in actual circuit testing, a "bad" actual circuit with a defect corresponding to the "bad" simulation would probably fail-to-compare.

Accordingly, a comparison which indicates a "bad" circuit simulation output at an indeterminate level and a "good" circuit simulation at a definitive level upon the application of a particular pattern increment is recorded. In order to distinguish such outputs where the "bad" circuit simulation is at an indeterminate level while the "good" circuit is at a definitive level, from true fail-to-compare's where the outputs from both "bad" and "good" circuits are at definitive levels and differ from each other, the former status has been designated as pseudo-fail-to-compare's. Because such pseudo-fail-to-compare's are not absolute in that the possibility remains that under actual testing in integrated circuit having only the fault represented by a "bad" circuit simulation manifesting a pseudo-fail-to-compare may produce an output at a definitive level which is the same as the "good" circuit, it is preferable in determining testability that pseudo-fail-to-compare's be considered only for "bad" circuit simulations which do not produce a true fail-to-compare during the application of the test pattern.

However, the proportion of "bad" circuit simulations which manifest such pseudo-fail-to-compare's provides the circuit designer with a valuable implement when correlated with the proportion of "bad" circuits which manifest true fail-to-compare's.

The description of the present invention has been specifically directed to systems involving three-level simulations of bilevel circuits and test patterns; it should be understood that the principle should apply equally to other multi-level test patterns and circuitry. The present system of determining testability is applicable to $n$-level test patterns and circuits employing corresponding $n$-level logic. In such instances, the test pattern is converted to an $(n+1)$-level pattern and the integrated circuit is simulated in $(n+1)$-level logic. The one level is representative of the indeterminate state while the n levels are respectively representative of the definitive state in accordance with the procedure set forth in U.S. Pat. No. 3,633,100.

The foregoing and other objects, features and advantages of the invention will be apparent from the following more particular description and preferred embodiments of the invention as illustrated in the accompanying drawings.

DESCRIPTION OF PREFERRED EMBODIMENT

Figure 1:
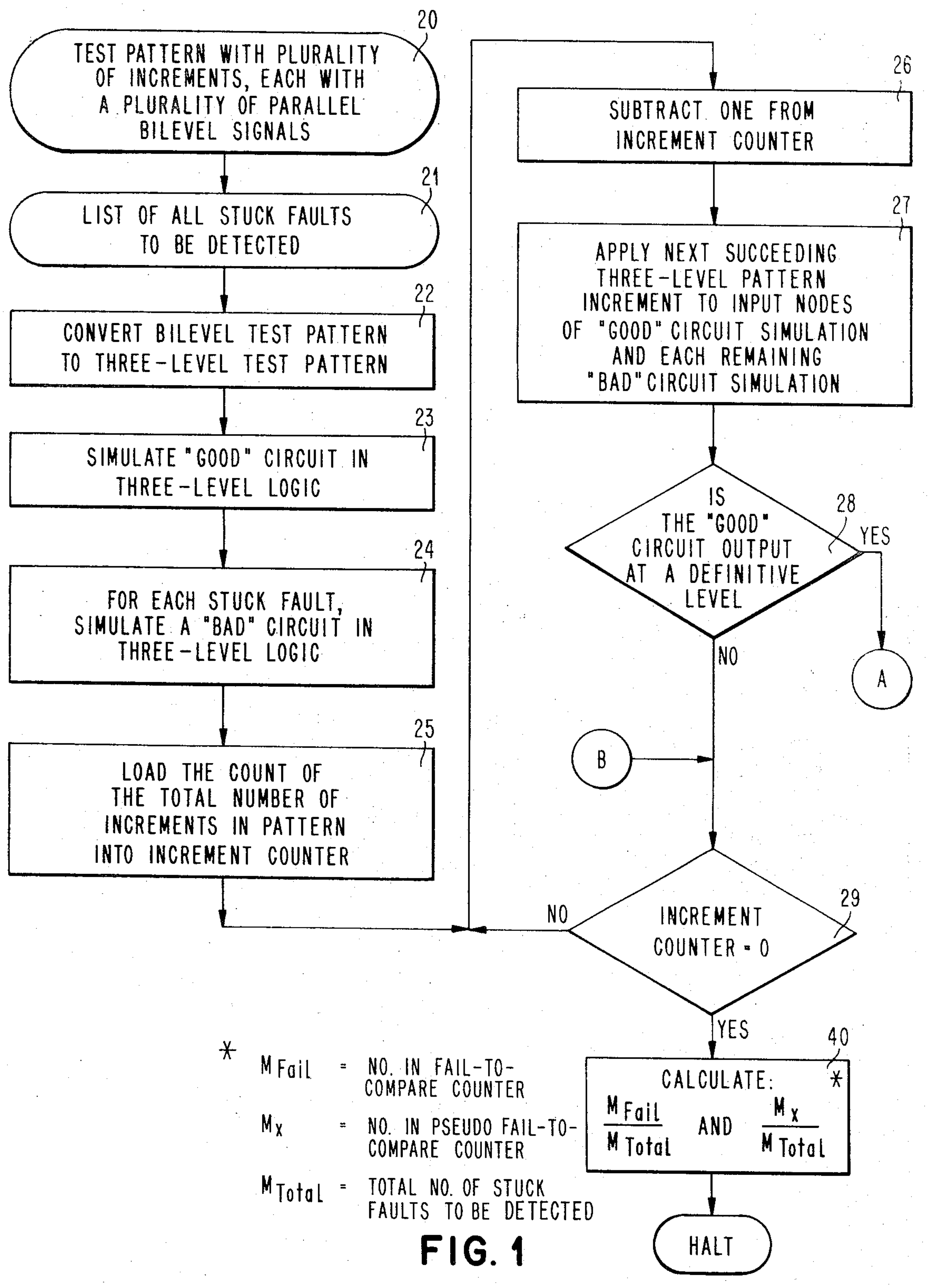
FIGS. 1 and 2, which should be read together, are flow charts of a preferred embodiment in accordance with the present invention.
Figure 2:
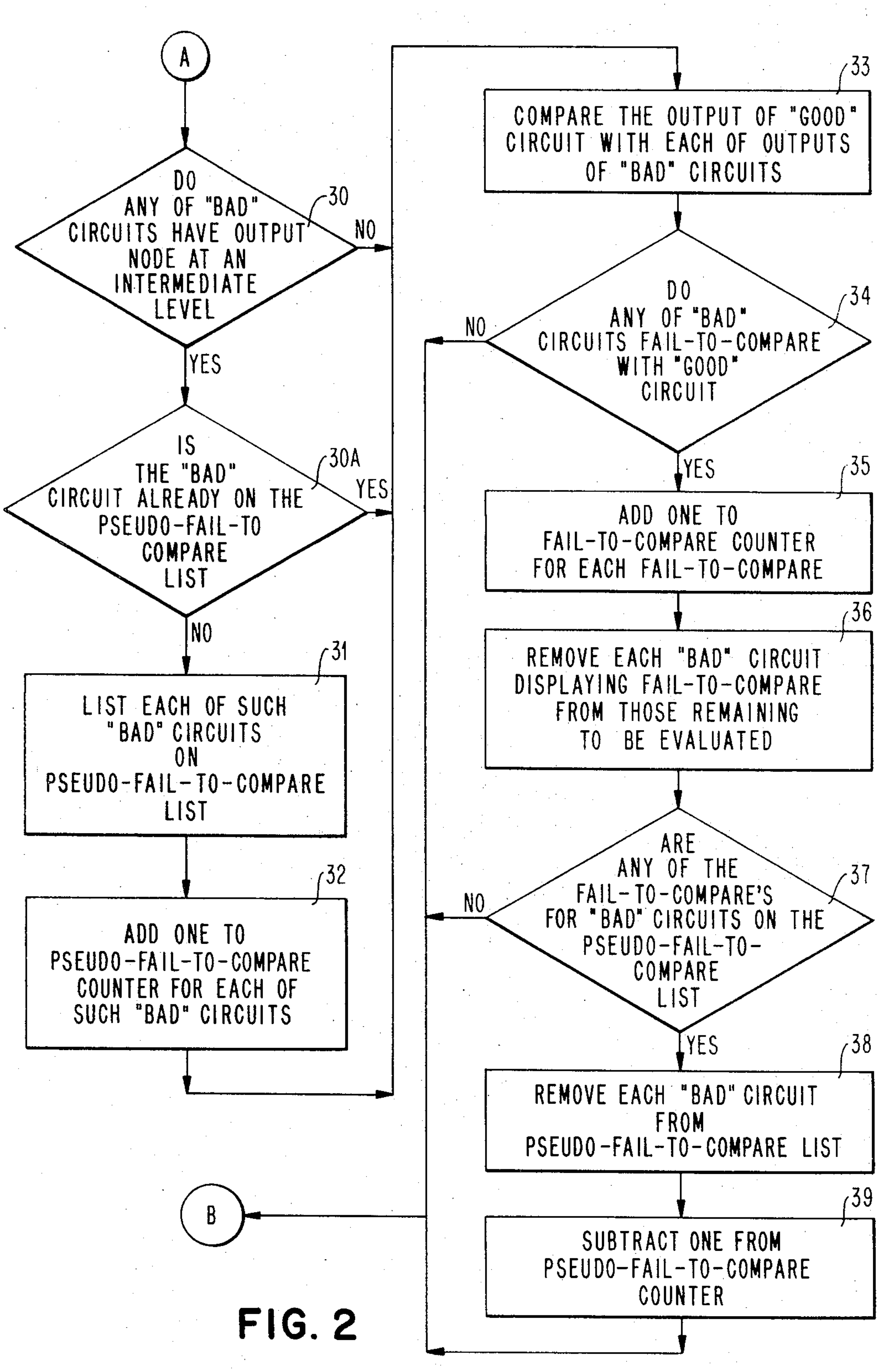
Figure 3:
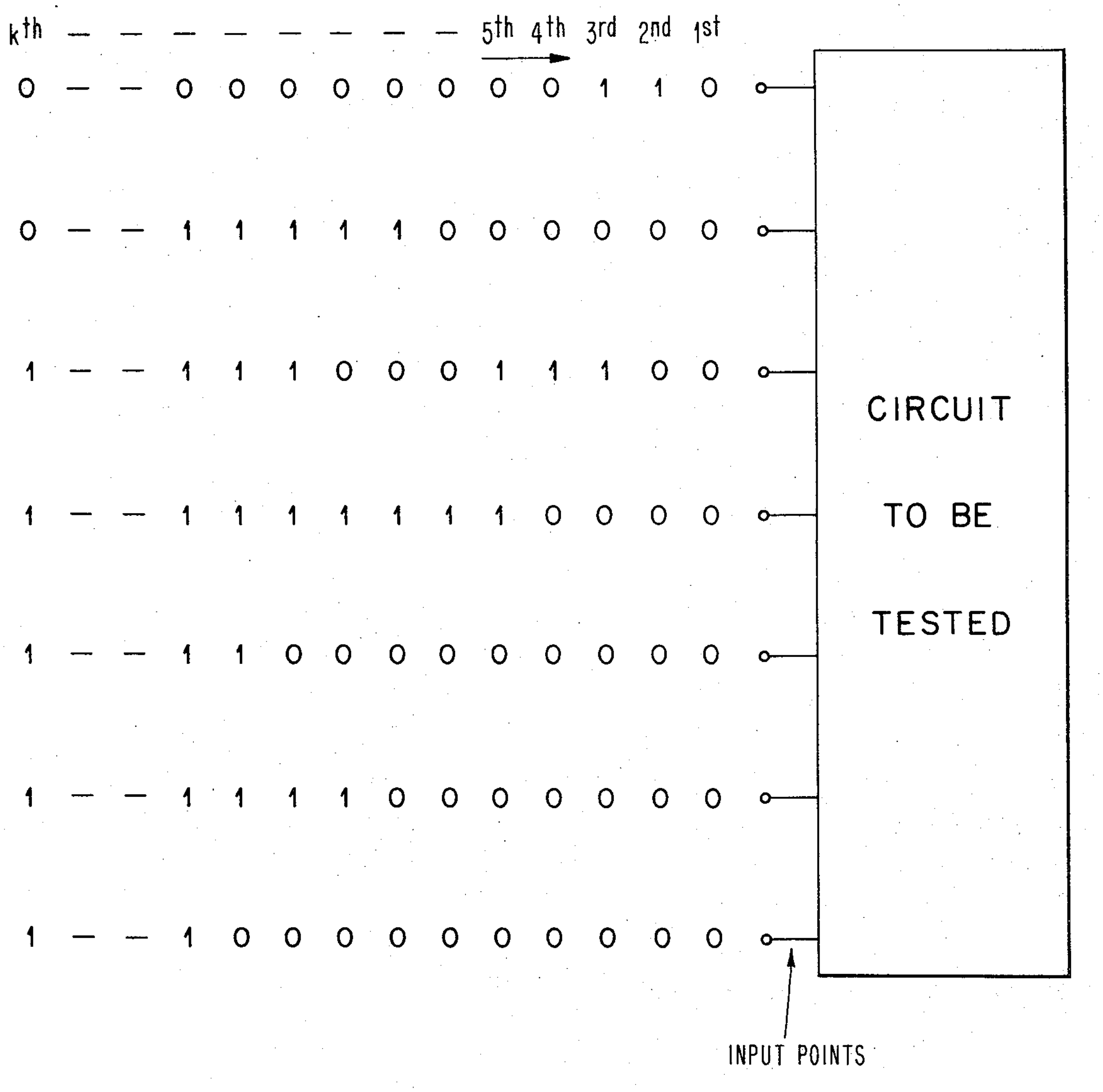
FIG. 3 is a diagrammatic illustration of the type of incremental bilevel signal pattern, the testability of which is to be determined.

With reference to FIGS. 1 and 2, a preferred embodiment of the system of the present invention will now be described. The input to the system includes the given test pattern, the testability of which is to be determined, block 20; this pattern is a bilevel test pattern of electrical signals comprising a plurality of pattern increments with each increment comprising a plurality of parallel bilevel signals. Each of these signals is to be applied to one of a plurality of input terminals in the integrated circuit which the test pattern is supposed to test. The generation or composition of such test patterns is well known in the art. The test pattern may be prepared manually or automatically, such as by a computer. It may be stored in any form of memory, e.g., in a computer or on punchcards. The stored data will merely designate the combination of "one's" or "zero's" in parallel in each increment. A convenient method of generating a highly rapid sequence of randomly varying test pattern increments would be by the pseudo-random number generators described in U.S. Pat. Nos. 3,614,6088 and 3,633,100. Such a test pattern is illustrated in FIG. 3, wherein the 1st through the *k*th pattern increments each contain seven parallel bilevel signals, each respectively applied to one of seven input points of a circuit to be tested, which circuit may be the actual circuit or a "good" or "bad" simulation of said circuit.

A list of stuck faults, block 21, is another input to the system. This list of stuck faults which the test pattern is to detect in the integrated circuit is usually predetermined by the circuit designer. For example, using the circuit of FIG. 4 as a simplified example of a portion of a non-linear sequential circuit, there are nineteen circuit points or nodes designated by the numerals 1–19. Each of these nodes may be subject to two stuck faults, a stuck at "one" and a stuck at "zero." Thus, there are 38 possible stuck faults. However, the circuit designer, based upon his experience, may conclude that it is not necessary to detect all possible stuck faults in order to fully test the integrated circuit. For example, with respect to the bilevel circuit of FIG. 4, the list of stuck faults to be detected would include only 23 stuck faults. These 23 stuck faults are as follows with respect to FIG. 4: node 1 stuck at "zero;" node 2 stuck at "zero;" node 3 stuck at "zero;" node 4 stuck at "zero;" node 5 stuck at "zero;" node 6 stuck at "zero;" node 7 stuck at "zero;" node 8 stuck at "zero;" node 9 stuck at "zero;" node 10 stuck at "zero;" node 11 stuck at "zero;" node 11 stuck at "one;" node 12 stuck at "zero;" node 13 stuck at "zero;" node 13 stuck at "one;" node 14 stuck at "zero;" node 15 stuck at "zero;" node 16 stuck at "zero;" node 17 stuck at "zero;" node 18 stuck at "zero;" node 18 stuck at "one;" node 19 stuck at "zero" and node 19 stuck at "one."

Next, block 22 in FIG. 1, the bilevel test pattern is converted to a three-level test pattern in which the first two levels represent the "one" and "zero" of the bilevel signal pattern, and the third level represents the *x* or indeterminate level which is indicative of an eccentric state usually resulting from critical race conditions in the circuitry. The conversion of the bilevel test pattern into a three-level test pattern may be accomplished in accordance with the teaching of U.S. Pat. No. 3,633,100, particularly by the approach of converting the bilevel pattern into a double-rail three-level pattern as described in said patent, specifically with respect to "The Convertor To Three-Level Logic."

Then, block 23, the "good" circuit is simulated in three-level logic. Like the three-level test pattern, the three-level simulation of the "good" circuit may also be in the form of double-rail logic as described in U.S. Pat. No. 3,633,100. The circuit shown in FIG. 5 is a double-rail three-level simulation of the bilevel circuit shown in FIG. 4. For convenience in illustration, while the circuits in FIGS. 4 and 5 respectively represent a portion of the integrated circuit to be tested and the three-level simulation of said portion, the operation of the present invention with respect to only this portion will be described.

The representation of bilevel logic by three-level logic simulation, particularly in the form of double-rail logic, is set forth in the test "The Logic Design of Transistor Digital Computers," G. E. Maley et al., 1963, at pages 283–288. Since there is in three-level logic, in addition to the two levels representing the binary "one" and "zero" level, a third or indeterminate *x* level, a three-level simulation must be constructed in such a manner that it will provide a definitive "one" or "zero" level when the input to the circuit is such that a definitive output can be arrived at. On the other hand, when the input is insufficient to provide a definitive output, the output will be at the indeterminate or *x* level. For example, when dealing with NOR gate logic as does the circuit of FIG. 4, each NOR gate may be implemented in double-rail logic by a pair of NAND gates as described in U.S. Pat. No. 3,633,100. In accordance with the disclosure in said patent, the NOR circuit of FIG. 4 is implemented in FIG. 5 in double-rail logic by the NAND gates.

Figure 4:
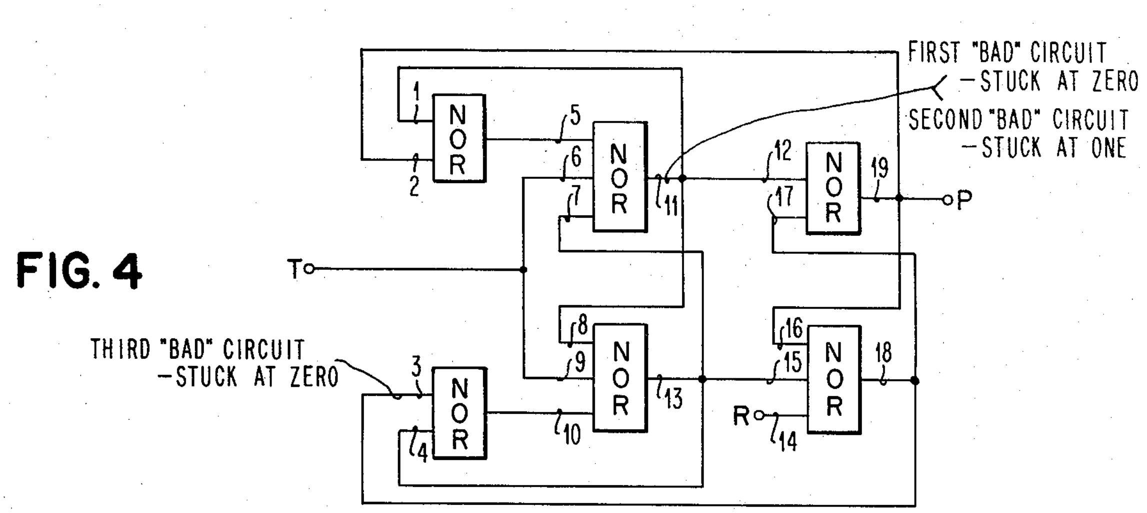
FIG. 4 is a block logic diagram of an illustrative sequential non-linear bilevel linear circuit which is to be tested.
Figure 5:
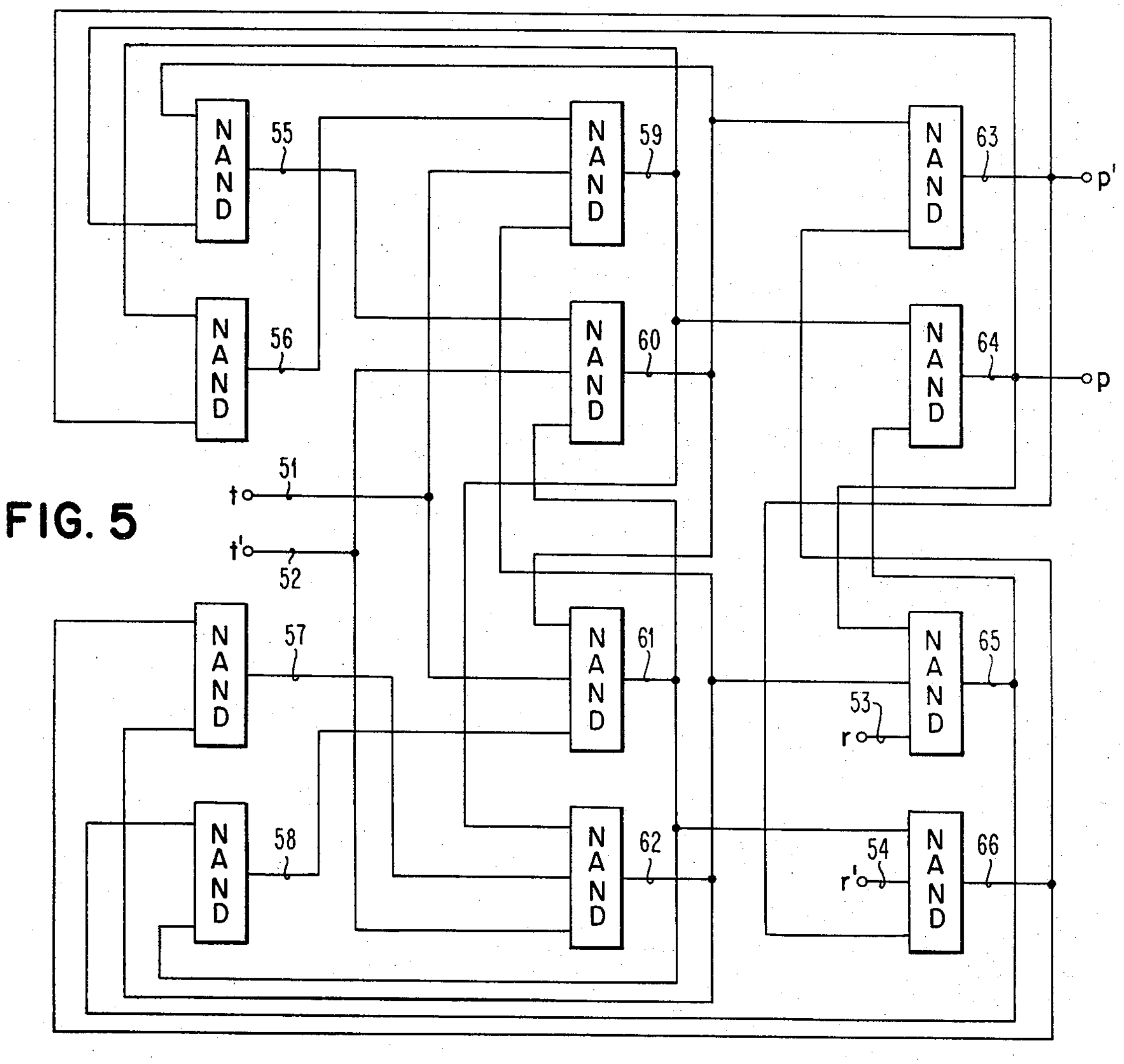
FIG. 5 is a block logic diagram of the three-level simulated circuit representative of the circuit of FIG. 4.

The simplified circuit portion shown in FIG. 4 has only two input terminals designated T and R and one output terminal designated P. In the three-level simulation of the circuit of FIG. 4 in double-rail logic, FIG. 5, input terminal T is represented by a pair of input terminals, *t*, *t'*, input terminal R is represented by a pair of input terminals, *r*, *r'*, and output terminal P is represented by a pair of output terminals, *p*, *p'*. Double-rail three value logic translation of the double terminals of FIG. 5, representative of the single terminals of FIG. 4, is shown below.

| FIGURE 4<br>Bilevel Logic<br>T, R or P | FIGURE 5<br>Three-Level Logic<br>*t*, *r* or *p* | <br><br>*t'*, *r'* or *p'* |
|---|---|---|
| 0 | 1 | 1 |
| x | 1 | 0 |
| 1 | 0 | 0 |

Figure 6:
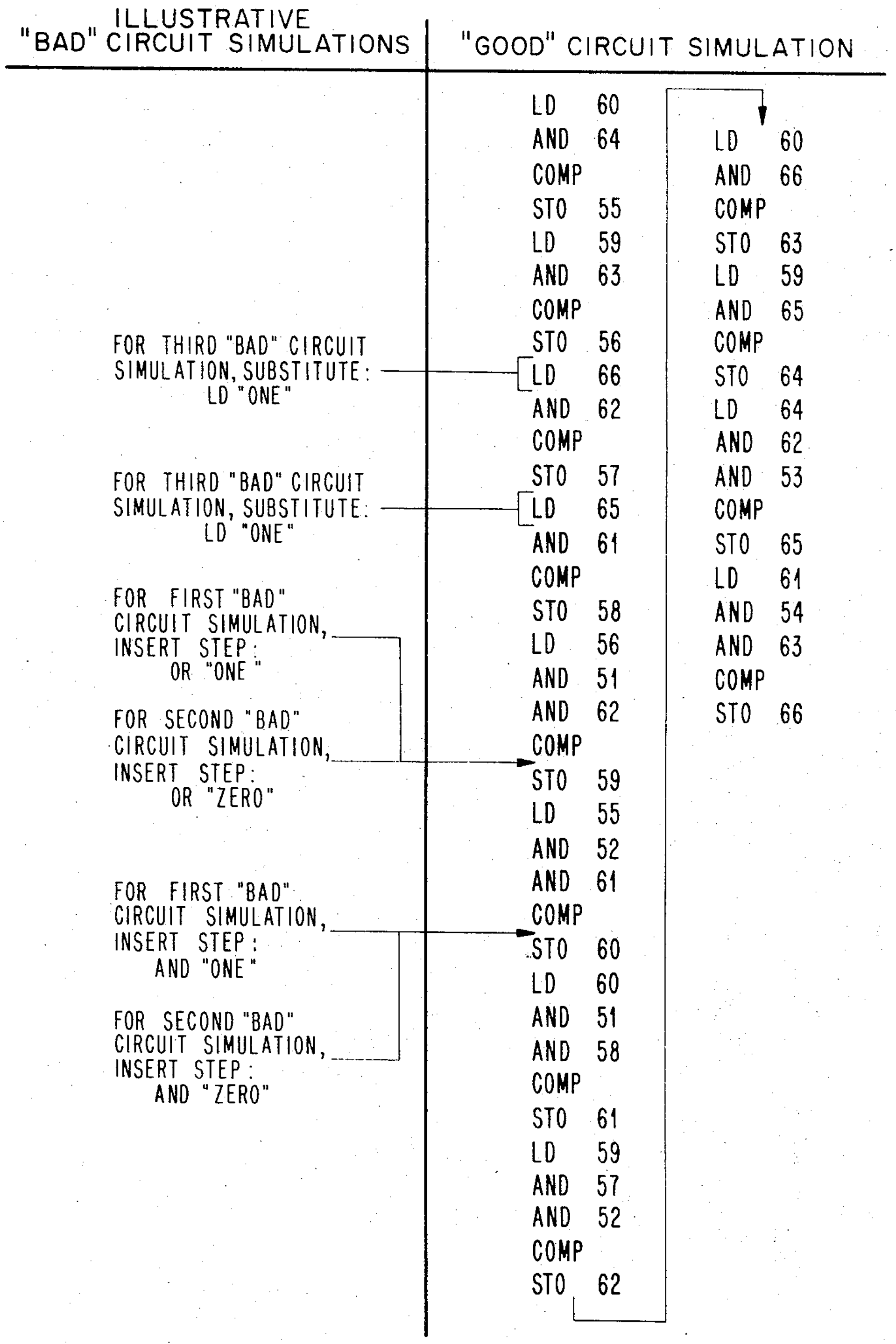
FIG. 6 is a chart setting forth the computer code instructions for simulating the circuit of FIG. 5 as a "good" circuit and as three different "bad" circuit simulations.

The three-level simulation of FIG. 5 of the "good" circuit may be accomplished in discrete hardware wherein each of the twelve NAND gates is represented by a discrete NAND gate circuit on a "breadboard" interconnected in the manner shown in FIG. 5 or, as is preferable, the three-level circuit of FIG. 5 may be computer-simulated. In such a computer simulation, all of the nodes in the double-rail circuit must be capable of assuming either a "one" or a "zero" level during the course of operation of the system. Such simulations are known in the art and will be described with respect to FIGS. 5 and 6 of the drawings. There is shown in FIG. 6 in the Columns "Good" Circuit Simulation, the programming instructions for simulating in the computer the double-rail circuit represented by the logic of FIG. 5. The programming instructions set forth in FIG. 6, which are almost self-evident, will be elaborated on as follows:

load 60;
and 64 with 60;
complement the sum;
store 55;
load 59;
and 63 with 59;
complement the result of said anding;
store 56;
load 66;
and 62 with 66;
complement the result of said anding;
store 57;
load 65;
and 61;
complement the result of said anding;
store 58;
load 56;
and 51 with 56;
and 62 with the result of said anding;
complement the total;
store 59;
load 55;
and 52 with 55;
and 61 with the results of said anding;
complement the total;
store 60;
load 60;
and 51 with 60;
and 58 with the results of said anding;
complement the total;
store 61;
load 59;
and 57 with 59;
and 52 with the results of said anding;
complement the total;
store 62;
load 60;
and 66 with 60;
complement the results of said anding;
store 63;
load 59;
and 65 with 59;
complement the results of said anding;
store 64;
load 64;
and 62 with 64;
and 53 with the results of said anding;
complement the total,
store 65;
load 61;
and 54 with 61;
and 63 with the results of said anding;
complement the total;
store 66.

Returning again to the flow chart of FIG. 1, a simulation in three-level logic must be made of a "bad" circuit for each of the stuck faults which the test pattern is to determine, block 24. Since, as previously set forth in the illustration, there are 23 possible stuck faults in the circuit which the test pattern is to detect, there must be twenty-three "bad" circuit simulations. Referring to FIG. 6, there are listed under illustrative "bad" circuit simulations, three of such 23 "bad" circuit simulations. Like the "good" circuit simulations, the "bad" circuit simulations may be simulated either in discrete hardware components or on the computer. In the present preferred embodiment, the "bad" circuits are computer simulated. The illustrative first, second and third circuit simulations to be illustrated are indicated in the bilevel circuits of FIG. 4 as follows:

First "bad" circuit simulation — node 11 stuck at "zero".

Second "bad" circuit simulation — node 11 stuck at "one".

Third "bad" circuit simulation — node 3 stuck at "zero".

The simulation of these three "bad" circuits in the three-level double-rail logic of FIG. 5 is illustrated in the list of programming instructions set forth in FIG. 6. The programming instructions for each of the three "bad" circuit simulations are substantially identical with "good" circuit simulations with the following respective exceptions:

For the first "bad" circuit simulation, at the two points indicated, the results of the previous complementing steps are ored with "one";

For the second "bad" circuit simulation, at the two points indicated, the results of the previous complementing steps are anded with "zero";

For the third "bad" circuit simulation, at the points indicated, a load "one" instruction is substituted respectively for the load 66 and load 65 instructions.

Again, with reference to FIG. 1, the count of the total number of pattern increments is loaded into an increment counter, block 25; since the pattern shown in FIG. 3 has *k* increments, the number *k* is loaded into the increment counter; one is subtracted from the increment counter, block 26, and the first pattern increment is applied to the input nodes or terminal of the "good" circuit simulation and each "bad" circuit simulation, block 27.

Again, it should be here noted that while each increment of the bilevel signal pattern shown in FIG. 3 contains seven input signals, we have, for simplicity in illustration, in FIG. 4 only considered a portion of the circuit containing two input terminals, T and R. Consequently, only two parallel signals, i.e., those which are applied to T and R, are considered here for each pattern increment. Since the circuit of FIG. 4 has been converted to the three-level double-rail simulated circuit of FIG. 5 in both the "good" and "bad" circuit simulations and the bilevel signal pattern has been converted into a double-rail, three-level signal pattern, the two input points T and R and, consequently, the signals in each increment applied to T and R are represented by four parallel signals respectively applied to points $t$, $t'$, $r$ and $r'$ in FIG. 5.

Next, FIG. 1, block 28, a decision is made as to whether the "good" circuit output is at a definitive level. If the output is not at a definitive level, no comparison is made with the "bad" circuit and the system is branched to block 29. On the other hand, if the "good" circuit output is at a definitive level, a comparison with the "bad" circuit simulations is to be made, and the system is branched to point A in FIG. 2 where, block 30, a determination is made first if any of the "bad" circuit simulations have any output level at an indeterminate level, i.e., a level not representative of a binary "one" or a binary "zero". If the decision is "Yes", which indicates that a "bad" circuit has an indeterminate output level while the corresponding "good" circuit output is at a definitive level, we have a pseudo-fail-to-compare. A determination is now made, decision block 30A, as to whether the "bad" circuit is already on the pseudo-fail-to-compare list; this list will be elaborated on hereinafter in the description. If the "bad" circuit is already on the list, the system is branched to block 33. If the "bad" circuit is not already on the pseudo-fail-to-compare list, one is added to the pseudo-fail-to-compare counter for each of such "bad" circuits at an indeterminate level, block 31. In addition, block 32, each of such "bad" circuits is recorded on a pseudo-fail-to-compare list.

Then, the next step in the system is block 33. Also, if the decision from block 30 was "No", i.e., no "bad" circuits with outputs at indeterminate levels, the system is branched directly to block 33. At this point, a comparison is made of the "good" circuit simulation with each of the "bad" circuit simulation outputs and a determination is made, block 34, as to whether any of the "bad" circuit simulations fail to compare with the "good" circuit simulations. If there are no fail-to-compare's, the system is branched through point B in FIG. 1 to block 29. On the other hand, if there are fail-to-compare's, the next step, block 35, FIG. 2, is to add one to the fail-to-compare counter for each "bad" circuit simulation which fails to compare with the "good" circuit simulation. Next, block 36, each "bad" circuit which resulted in a fail-to-compare is removed from those remaining to be evaluated in future iterations of the system. In other words, once a "bad" circuit results in or displays a fail-to-compare, it need no longer be evaluated since this is an indication that the applied test pattern is appropriate for the detection of the particular stuck fault represented by said "bad" circuit.

Then, decision block 37, a determination is made as to whether any of the "bad" circuits which resulted in the fail-to-compare's are on the pseudo-fail-to-compare list from the application of previous pattern increments during previous iterations of the system. It should be noted that while this is the first iteration of the system as a result of the application of the first pattern increment, there may be on subsequent iterations a number of "bad" circuits on the pseudo-fail-to-compare list. Since, as has been previously stated, a true fail-to-compare is more definite than a pseudo-fail-to-compare, the storage of a pseudo-fail-to-compare is not necessary once a true fail-to-compare is achieved for a given "bad" circuit. Consequently, block 38, the "bad" circuit is removed the pseudo-fail-to-compare list and, block 39, one is removed from the pseudo-fail-to-compare counter.

As previously indicated, the portion of the integrated circuit which we have been utilizing for illustration, as set forth in FIG. 4 and in three-level (double-rail) logic in FIG. 5, has only one output point or signal P, represented in three-level logic by a single pair *p'p*, FIG. 5. It is probable that in actual practice, the circuit being evaluated will have more than one output point or signal and, consequently, a plurality of three-level pairs. In the latter case, the output increment resulting from the application of a given test pattern increment will comprise a plurality of three-level pairs. It should be understood that with such plural output signal increments, steps 28–39 should be repeated for each of the plurality of three-level output signal pairs.

Then, the system is returned through point B to block 29 in FIG. 1. Likewise, if the decision from block 37 is "No", indicating that none of the fail-to-compare's were for "bad" circuits on the pseudo-fail-to-compare list, the system is directly branched through point B to block 29 in FIG. 1. In block 29, a determination is made as to whether the increment counter equals zero, i.e., whether any pattern increments remain to be applied. Since this is the first pattern increment, the decision is "No" and the system is returned to block 26 and the previously described system steps are repeated, one iteration for each pattern increment, until the increment counter equals zero and the "Yes" branch from block 29 results in the calculations indicated in block 40.

The calculation $M_{fail}/M_{total}$, wherein $M_{fail}$ is the number in the fail-to-compare counter and $M_{total}$ are the total number of stuck faults to be detected, gives the proportion of the total number of stuck faults which result in true fail-to-compare's upon the application of the test pattern. For example, we have previously mentioned in the illustration that the test pattern is to determine twenty-three stuck faults. Assuming that there are eighteen true fail-to-compare's and the count in the counter would be eighteen, the test pattern applied is capable of detecting 18/23 or about 79 percent of the stuck faults. The ratio $M_x/M_{total}$ indicates similarly the proportion of pseudo-fail-to-compare's which the test pattern results in. For example, assume that the number in the pseudo-fail-to-compare counter is three. Therefore, 3/23 or 13 percent of the stuck faults are pseudo-fail-to-compare's or pseudo-detected by the test pattern. In essence, these figures indicate that the test pattern is definitely capable of detecting 79 percent of the possible stuck faults in the circuits, and is probably capable of detecting up to an additional 13 percent of the stuck faults. 8 percent of the stuck faults are not detectable by the test pattern. After this determination is made, the system is halted.

Figure 7:
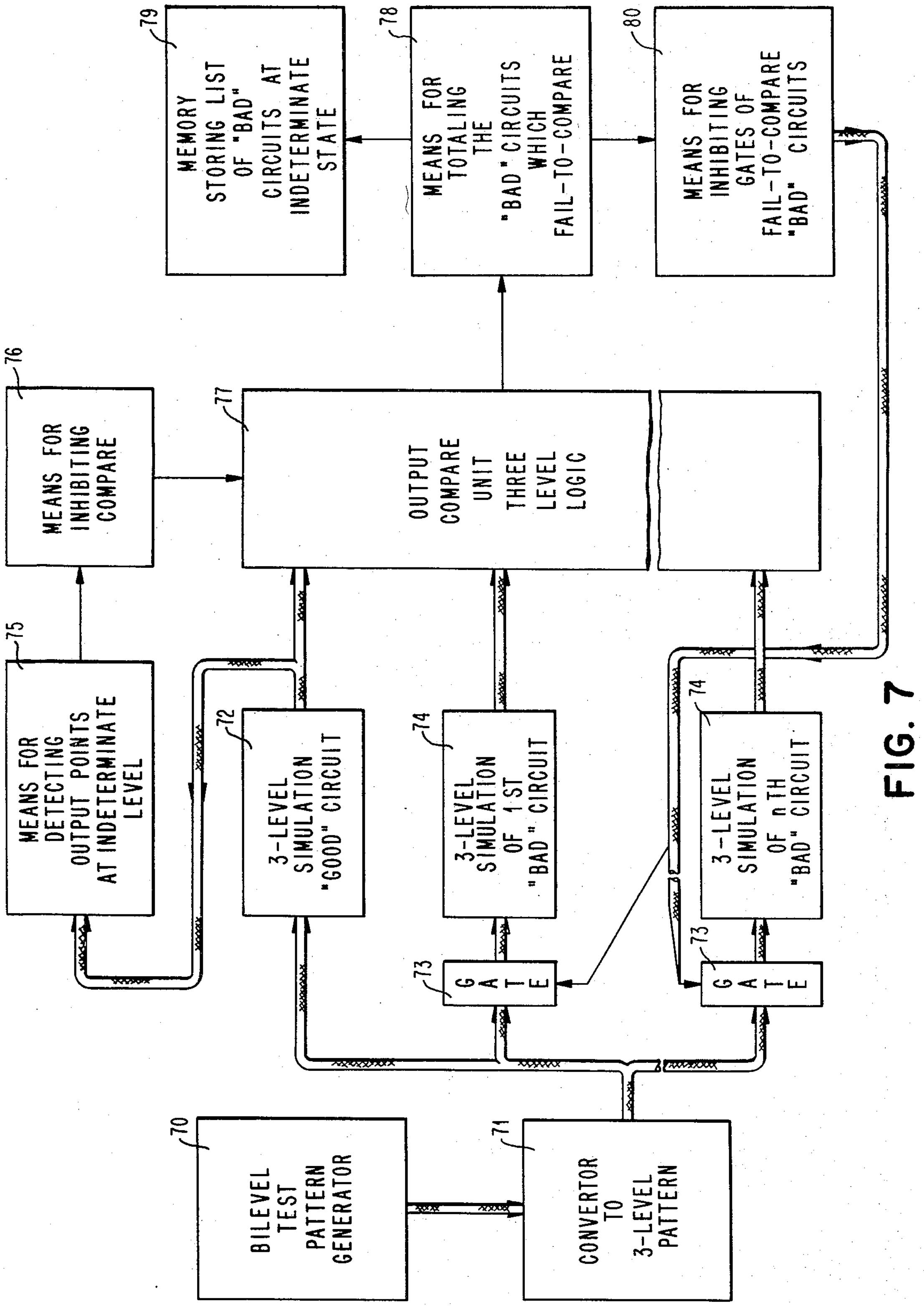
FIG. 7 is a general block diagram of apparatus which may be used in implementing the present invention.

While in the preferred embodiment of the present invention there has been described a system which is to be implemented on a general-purpose computer in the conventional manner, it should also be clear to those skilled in the art that the system of the present invention can also be implemented in specific purpose hardware designed to function only in the implementation of the system of the present invention. It has already been stated that the three-level "good" and "bad" circuit simulations may be implemented in a general-purpose computer or in a "breadboard" simulation utilizing discrete circuit components for the NAND gates in the three-level simulation. In addition, as will be described in a general fashion with respect to FIG. 7, the remainder of the system may also be implemented in specific purpose hardware. The hardware shown in the block diagram of FIG. 7 can be implemented utilizing the teachings of U.S. Pats. Nos. 3,614,608 and 3,633,100. In FIG. 7, a bilevel test pattern is generated by pattern generator 70 and converted to a three-level pattern by convertor 72 in the manner described in U.S. Pat. No. 3,633,100. Each increment of the three-level pattern is simultaneously applied to the three-level simulation of the "good" circuit 72 and to a bank of gates 73, each of which will pass the increment to a corresponding three-level simulation of a given "bad" circuit 74. There is one of such three-level simulations for each "bad" circuit. The output of the "good" circuit simulation is applied to means for detecting whether there are any output points at an indeterminate level 75. These detecting means are described in U. S. Pat. No. 3,633,100. If there are any such "good" circuit simulation points at an indeterminate level, there are means 76 for inhibiting any "good" and "bad" circuit comparisons. Such means for inhibiting comparison are also described in U. S. Pat. No. 3,633,100. If a comparison is not inhibited, a comparison is made in unit 77 of the "good" circuit simulation output with each of the outputs of the "bad" circuit simulations to which the input pattern increments have been passed by their respective gates 73. Unit 77 may be implemented in hardware as described in U.S. Pat. No. 3,633,100. Although the comparison unit in said patent deals with single-rail logic, a comparison of double-rail logic is carried out in a similar manner merely by increasing the number of points to be compared. The output of comparison unit 77 will indicate the "bad" circuits which are at definitive levels and which also fail to compare, as well as the "bad" circuits having outputs at indeterminate levels. Means 78 count the number of "bad" circuits which fail to compare, while means 79 list the "bad" circuits at indeterminate states. This provides the "bad" circuits which pseudo-fail-to-compare. In order to prevent further comparison of "bad" circuits which have already manifested a fail-to-compare output, means 80 provide signals inhibiting the gates 73 from passing subsequent pattern increments to "bad" circuit simulations which have already manifested a fail-to-compare.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In the testing of non-linear integrated circuits having *n*-level logic by the application to a plurality of input terminals in the circuit being tested of an *n*-level electrical signal test pattern having a plurality of sequential pattern increments, each comprising a plurality of parallel *n*-level signals, each signal respectively applied to one of said input terminals and the sensing of the resulting circuit output from at least one circuit output terminal, a system for determining whether a given *n*-level test pattern is an acceptable test pattern for a given *n*-level integrated circuit comprising:

means for converting the *n*-level signal pattern to an $(n+1)$-level signal pattern in which the *n* levels respectively represent the *n* definitive levels in the original pattern and said one level represents an indeterminate state;

means for forming an $(n+1)$-level logic "good" circuit simulation of said *n*-level integrated circuit in which the *n* levels represent the *n* definitive states in the circuit and said one level represents an indeterminate circuit state, said simulation having input nodes representative of said input terminals and at least one output node representative of said output terminal, and said "good" circuit simulation being free of fault conditions;

for each fault condition to be detected by said signal patter, means for forming an $(n+1)$-level logic "bad" circuit simulation, representative of the circuit with said fault condition, said simulation being identical with said "good" circuit simulation except that the circuit portion at which the fault occurs is fixed at said fault condition;

means for applying said $(n+1)$-level test pattern to the plurality of input nodes of said "good" circuit simulation and to the plurality of input nodes in each of said "bad" circuit simulations;

for each applied increment of said pattern, means for comparing the output signal increments resulting from said applied increment at said at least one output node of said "good" circuit simulation with the corresponding output signal increment at each of said "bad" circuit simulations;

means, connected to and receiving the output of said comparing means, for recording the total number of "bad" circuit simulations having at least one output signal at a definitive level which fails to compare with its corresponding "good" circuit simulation output signal which is at a definitive level; and, means, connected to and receiving the output of said comparing means, for recording the total number of "bad" circuit simulations having at least one output signal at said indeterminate level when its corresponding "good" circuit simulation output signal is at a definitive level.

2. In the testing of non-linear bilevel integrated circuits by the application to a plurality of input terminals in the circuit being tested of a bilevel electrical signal test pattern having a plurality of sequential pattern increments, each comprising a plurality of parallel bilevel signals, each signal respectively applied to one of said input terminals and the sensing of the resulting circuit output from at least one circuit output terminal, a system for determining whether a given bilevel test pattern is an acceptable test pattern for a given bilevel integrated circuit comprising:

means for converting the bilevel signal pattern to a three-level signal pattern in which the first and second levels respectively represent the two definitive levels in the original pattern and the third level represents an indeterminate state;

means for forming a three-level logic "good" circuit simulation of said bilevel integrated circuit in which the first and second levels represent the two definitive states in the bilevel circuit and the third level represents an indeterminate circuit state, said simulation having input nodes representative of said input terminals and at least one output node representative of said output terminal, and said "good" circuit simulation being free of fault conditions;

for each fault condition to be detected by said signal pattern, means for forming a three-level logic "bad" circuit simulation, representative of the circuit with said fault condition, said simulation being identical with said "good" circuit simulation except that the circuit portion at which the fault occurs is fixed at said fault condition;

means for applying said three-level test pattern to the plurality of input nodes of said "good" circuit simulation and to the plurality of input nodes in each of said "bad" circuit simulations;

for each applied increment of said pattern, means for comparing the output signal increments resulting from said applied increment at said at least one output node of said "good" circuit simulation with the corresponding output signal increment at each of said "bad" circuit simulations;

means, connected to and receiving the output of said comparing means, for recording the total number of "bad" circuit simulations having at least one output signal at a definitive level which fails to compare with its corresponding "good" circuit simulation output signal which is at a definitive level; and, means, connected to and receiving the output of said comparing means, for recording the total number of "bad" circuit simulations having at least one output signal at said indeterminate level when its corresponding "good" circuit simulation output signal is at a definitive level.

3. The system of claim 2 wherein said given integrated circuit to be tested is only a portion of a more extensive integrated circuit.

4. In the testing of non-linear bilevel integrated circuits by the application to a plurality of input nodes in the circuit being tested of a bilevel electrical signal test pattern having a plurality of sequential pattern increments, each comprising a plurality of parallel bilevel signals, each signal respectively applied to one of said input nodes and the sensing of the resulting circuit output from at least one circuit output node, a system for determining whether a given bilevel test pattern is an acceptable test pattern for a given bilevel integrated circuit comprising:

means for converting the bilevel signal pattern to a three-level signal pattern in which the first and second levels respectively represent the two definitive levels in the original pattern and the third level represents an indeterminate state;

means for forming a three-level logic "good" circuit simulation of said bilevel integrated circuit in which the first and second levels represent the two definitive states in the bilevel circuit and the third level represents an indeterminate circuit state, said simulation having input and output nodes representative of said circuit nodes and a plurality of circuit nodes intermediate said input and output nodes, and said "good" circuit simulation being free of stuck faults;

for each stuck fault to be detected by said signal pattern, means for forming a three-level logic "bad" circuit simulation, representative of the circuit with said fault condition, said simulation being identical with said "good" circuit simulation except that the one node at which the fault occurs is fixed at one of said first and second levels;

means for applying said three-level test pattern to the plurality of input nodes of said "good" circuit simulation and to the plurality of input nodes in each of said "bad" circuit simulations;

for each applied increment of said pattern, means for comparing the output signal increments resulting from said applied increment at said at least one output node of said "good" circuit simulation with the corresponding output signal increment at each of said "bad" circuit simulations;

means, connected to and receiving the output of said comparing means, for recording the total number of "bad" circuit simulations having at least one output signal at a definitive level which fails to compare with its corresponding "good" circuit simulation output signal which is at a definitive level; and, means, connected to and receiving the output of said comparing means, for recording the total number of "bad" circuit simulations having at least one output signal at said indeterminate level when its corresponding "good" circuit simulation output signal is at a definitive level.

5. The system of claim 3 wherein the means for recording said fail-to-compare totals and said indeterminate level totals record said respective totals separately, and said means for recording said indeterminate level totals are adapted so as to include in the indeterminate level totals only "bad" circuits which do not manifest a fail-to-compare.

6. The system of claim 5 further including means, connected to both of said means for recording, for calculating the proportions:

$M_{fail}/M_{total}$ and $M_x/M_{total}$ are determined, where $M_{total}$ = Total "Bad" Circuits = Total Stuck Faults, $M_{fail}$ = Recorded Total "Bad" Circuits with outputs which fail to compare at least once, and $M_x$ = Recorded Total "Bad" Circuits with outputs at indeterminate levels when "Good" Circuit output is at definitive level.

7. The system of claim 6 further including means, connected to said calculating means, for further calculating the two calculated proportions.

8. The system of claim 4 wherein each of said stuck faults to be detected results from a circuit node being stuck at either one of said definitive levels.

9. The system of claim 4 wherein said means for comparing are operable only if the output increment of the "good" circuit simulation is at a definitive level.

10. The system of claim 4 wherein said three-level signal pattern and said three-level logic simulations are formed in double-rail logic.

11. The system of claim 4 wherein said given bilevel test pattern is a randomly generated test pattern.

* * * * *